(12) United States Patent
Euget et al.

(10) Patent No.: US 6,865,178 B1
(45) Date of Patent: Mar. 8, 2005

(54) METHOD AND SYSTEM FOR ESTABLISHING SNA CONNECTION THROUGH DATA LINK SWITCHING ACCESS SERVICES OVER NETWORKING BROADBAND SERVICES

(75) Inventors: Guy Euget, Vence (FR); Didier Giroir, Cagnes-sur-Mer (FR)

(73) Assignee: International Business Machines Corporation, Armonk, NY (US)

(*) Notice: Subject to any disclaimer, the term of this patent is extended or adjusted under 35 U.S.C. 154(b) by 688 days.

(21) Appl. No.: 09/587,627

(22) Filed: Jun. 5, 2000

(30) Foreign Application Priority Data

Aug. 20, 1999 (EP) .......................................... 99480076

(51) Int. Cl.[7] .............................................. H04L 12/66
(52) U.S. Cl. ........................ 370/352; 370/400; 370/408
(58) Field of Search ................................ 370/352, 350, 370/360, 401, 422

(56) References Cited

U.S. PATENT DOCUMENTS

| | | | | |
|---|---|---|---|---|
| 4,914,571 A | * | 4/1990 | Baratz et al. | 707/10 |
| 5,426,637 A | * | 6/1995 | Derby et al. | 370/401 |
| 5,602,841 A | * | 2/1997 | Lebizay et al. | 370/413 |
| 5,737,526 A | * | 4/1998 | Periasamy et al. | 709/241 |
| 5,909,550 A | * | 6/1999 | Shankar et al. | 709/227 |
| 6,061,728 A | * | 5/2000 | Mead et al. | 709/227 |
| 6,331,983 B1 | * | 12/2001 | Haggerty et al. | 370/400 |
| 6,571,272 B1 | * | 5/2003 | Ferguson et al. | 709/200 |

OTHER PUBLICATIONS

IBM International Technical Support Organization; "IBM International Technical Support Centers—Networking Broadband Services (NBBS)—Architecture Tutorial—GG24–4486–00"; pp. i–233; Jun., 1995, Raleigh, North Carolina.

McGraw–Hill; David G. Matusow; SNA, APPN, HPR, and TCP/IP Integration; pp. 249–269; 1996; New York, New York.

* cited by examiner

*Primary Examiner*—Huy D. Vu
*Assistant Examiner*—Daniel Ryman
(74) *Attorney, Agent, or Firm*—McGuireWoods LLP; John R. Pivnichny (57) ABSTRACT

A method and system for implementing of Data Link Switching-like protocols within a high speed packet switching network environment. The invention relates to new access services for NBBS (Networking Broad Band Services) networks. A new access agent (implementing the DLSw Access Services) provides a dramatically simplified but comprehensive Data Link Switching Services across a wide area network and minimizes the latency to set up SNA paths across the network, while maximizing the efficiency of setting up these paths. The invention does not require the implementation of a complex and large TCP/IP protocol stack within the Data Link Switching node. The Access Agent implementing the DLSw node makes intensive use of such NBBS facilities as the Spanning Tree with the use of internode functional addresses, for the exchange of the control information necessary to efficiently set up paths across the network between DLSw access agents.

14 Claims, 5 Drawing Sheets

METHOD AND SYSTEM FOR ESTABLISHING SNA CONNECTION THROUGH DATA LINK SWITCHING ACCESS SERVICES OVER NETWORKING BROADBAND SERVICES

TECHNICAL FIELD

The present invention relates to packet switching communication networks and more particularly to a system and method for establishing a Systems Network Architecture (SNA) connection between a source SNA node and a target SNA node through a packet switching network using Data Link Switching (DLSw) access services.

BACKGROUND

There is a need today for High-speed packet switching networks. Data transmission is now evolving, with a specific focus on applications and by integrating a fundamental shift in the customer traffic profile. Driven by the growth of the number of intelligent (programmable) workstations, the pervasive use of local area network interconnections, the distributed processing capabilities between workstations and super computers, the new applications and the integration of various and often conflicting structures—hierarchical versus peer to peer, wide versus local area networks, voice versus data—the data profile has become more bandwidth consuming, bursting, non-deterministic and requires more connectivity. Based on the above observations, there is a strong requirement for supporting distributed computing applications across high speed wide-area networks that can carry local area network communications, voice, video and traffic among channel attached hosts, business or engineering workstations, terminals, and small to large file server systems. This vision of a high speed multi-protocol network is the driver for the emergence of fast packet switching network architectures such as Networking BroadBand Services (NBBS) architecture in which data, voice, and video information is digitally encoded, chopped into small packets (of fixed or variable length) and transmitted through a common set of nodes and links. In this continuously evolving environment there still is and will be for the many years to come, a major requirement for transporting "legacy" data traffic, such as System Network Architecture (SNA) traffic across wide area networks.

An efficient transport of mixed traffic streams on very high speed lines means for these new network architectures, a set of strict requirements in terms of performance and resource consumption. The requirements are a very high throughput and a very short packet processing time, an efficient set of flow and congestion control mechanisms and, a very large flexibility to support a wide range of connectivity options.

The high-speed networks are very concerned with the throughput and processing time. As a matter of fact, one of the key requirements of high speed packet switching networks is to reduce the end to end delay in order to satisfy real time delivery constraints and to achieve the necessary high nodal throughput for the transport of voice and video. Increases in link speeds have not been matched by proportional increases in the processing speeds of communication nodes. The fundamental challenge for high speed networks such as those based on NBBS (Networking BroadBand Services) technologies is to minimize the packet processing time and to take full advantage of the high speed/low error rate technologies. Most of the transport and control functions provided by the new high bandwidth network architectures are performed on an end to end basis. The flow control and particularly the path selection and bandwidth management processes are managed by the access points of the network (where the NBBS Access Services reside), which reduces both the awareness and the functions of the intermediate nodes.

One other problem with high-speed networks is network congestion and flow control. Communication networks have at their disposal limited resources to ensure efficient packet transmissions. An efficient bandwidth management strategy is essential to take full advantage of a high speed network. While transmission costs per byte continue to drop year after year, these costs are likely to continue to represent the major expense of operating future telecommunication networks as the demand for bandwidth increases. Thus considerable efforts have been spent on designing flow and congestion control processes, bandwidth reservation mechanisms, routing algorithms to economically manage the network bandwidth. An ideal network should be able to transmit a useful traffic directly proportional to the traffic offered to the network and this as far as the maximum transmission capacity is reached. Beyond this limit, the network should operate at its maximum capacity whatever the demand is.

In high speed networks, the nodes must provide total connectivity. This includes attachment of the user devices, regardless of vendors or protocols, and the ability to have the end user communicate with any other device or group of devices (when justified or required). The network must support any type of traffic such as data (including "legacy" data), voice, video, fax, graphic or image related traffic. Nodes must be able to take advantage of all common carrier facilities and to be adaptable to a plurality of protocols. All needed conversions must be automatic and transparent to the end user.

The architectures of most high speed packet switching networks specify a set of generic services that offer end-to-end high bandwidth transport capabilities. The present application relates to transmissions in wide-area networks (WANs) based on the IBM's Networking BroadBand Services (NBBS) architecture described in International Business Machine publication "IBM International Technical Support Centers—Networking Broadband Services (NBBS)—Architecture Tutorial—GG24-4486-00" dated June 95. NBBS Services can be divided into three major areas which are the transport services, the network control services and the access services.

The Transport Services provide a common infrastructure to support the transfer of information across the network. They are not used directly but through the Access Services (Access Agents). The Transport Services can be divided into three distinct functions which are implemented in three layers consisting in the Logical Link Layer, a Network Connection Layer, and the various Transport Protocols.

The Network Control Services ensure that the Transport and Access Services operate reliably, efficiently, and as automatically as possible. They are used to control, allocate, and manage the resources of the network on a real-time basis. They also provide network operators with the various facilities that are needed to configure, operate, and maintain the network on a day-to-day basis. This includes facilities for monitoring the performance of the network, accounting for its usage, and resolving problems.

The Access Services (Access Agents) provide an interface between the common high speed network (or backbone network) and external devices or networks via access link interfaces. The Access Services enable a wide range of external devices to get access to the common infrastructure provided by the Transport Services.

Together, the Transport, Network Control and Access Services provide the capability to support communications between many different types of communicating devices through a common network infrastructure.

A major capability of most high speed networks is their ability to support a diverse range of high speed multimedia telecommunication services using common equipment. Each Access Service (also called Access Agent) provides the support for a particular set of telecommunication services—ATM (Asynchronous Transfer Mode), FR (Frame Relay), PCM (Pulse Code Modulation) voice, Circuit emulation, HDLC ((High-level Data Link Control) . . . —and enables those Access Agents to transport traffic across a common network. An Access Agent comprises three logically separate components which are the Protocol Agent (PA), the Directory Agent (DA) and the Connection Agent (CA). A Protocol Agent understands and interprets the access protocol (the System Network Architecture Protocol in the present application), a Directory Agent is in charge of locating resources across the network, and a Connection Agent (CA) establishes connections between Access Agents. Each NBBS network node contains one or many of these Access Agents, depending on the physical interfaces it attaches to and on the access protocols it understands and supports. Valid examples of access services are Frame Relay or Asynchronous Transfer Mode (ATM) Access Agents.

Data Link Switching (DLSw) protocol has been created to provide SNA connectivity over IP (Internet Protocol) networks and this standard protocol is described in RFC (Request For Comments) 1474 and 1795. A presentation of DLSw mechanisms and SNA protocols can be found in "SNA, APPN, HPR & TCP/IP INTEGRATION" by David G. Matusow (ISBN 076041051-8). SNA is a session oriented protocol. The DLSw design allows to satisfy the SNA requirements even though SNA nodes are in disjointed configurations, i.e not adjacent, but interconnected through an IP network. From an SNA node standpoint, nodes are directly interconnected (i.e logically adjacent) and have no perception or visibility of the TCP/IP network in between them. Data Link Switching (DLSw) is basically a bridging protocol between two SNA Devices (SNA Nodes), where the bridging technology is based on the 802.2 LLC protocol. DLSw protocols provide for local acknowledgment of SNA transmission which suppresses any timing problem due to delays across a wide area infrastructure. DLSw protocols locally insures the retransmission of lost frames, avoiding costly retransmissions across the Wide Area Network (WAN).

Figure 1:
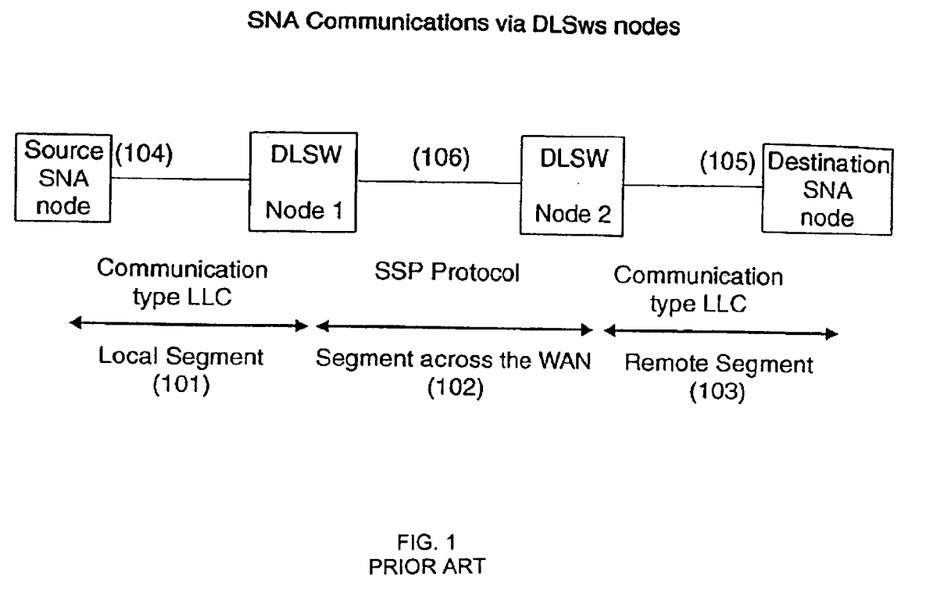
FIG. 1 illustrates how Data Link Switching operates to enable two SNA nodes to communicate across the NBBS Wide Area Network.

As shown in FIG. 1, the SNA message is delivered across three different segments which are (101) the local segment (from source SNA node to source DLSw node 1), (102) the segment across the WAN connection between two DLSw nodes (from DLSw node 1 to DLSw node 2 across the NBBS network) and finally, (103) the remote segment (between DLSw node 2 and far end destination SNA Node).

Communication between DLSw nodes is provided through a Switch to Switch Protocol (SSP). The SSP protocol does not provide full routing, but instead, provides switching at the SNA data link layer (layer 2) and encapsulation within TCP/IP for the transport over the wide area network. Each SDLC (Synchronous Data Link Control) Physical Unit (PU, 104 and 105) is presented to the SSP protocol (106) as a unique MAC/SAP (Medium Access Control/Service Access Point) address pair. For Token Ring LANs, DLSw appears as a source routing bridge. The main difference between DLSw and bridging is that the DLSw protocol locally terminates the LLC type 2 (and therefore provides best results for the transport of SNA information over long haul networks). Before DLSw based transmission can occur between two DLSw nodes, two TCP connections must be established between these DLSw nodes; one per direction of communication due to the TCP protocol characteristics. Each DLSw node has to maintain a list of all other DLSw capable peers and their status (active/inactive).

The data link switching operations which are described hereunder are first qualified by the DLSws exchanges. Communication between two DLSw nodes is realized via two kind of messages which are the Control messages (with a 72-bytes header), and the Information messages (with a 16-bytes header). A TCP (Transmission Control Protocol) session will be established between the two DLSw nodes, to exchange these messages. The communication will be assured by the management of the parameters dedicated to SNA, DLSw and transport resources identification.

For the SNA identification parameters, a data link is identified by a Data Link ID (14 bytes) comprising the pair of attachment addresses. Each attachment address is represented by the concatenation of a MAC address (6 bytes wide) with a Service Access Point identificator (1 byte wide).

For the DLSw parameters, the global end-to-end circuit, inside the SSP control header, is identified by a pair (origin and destination) of Circuit ID (64 bits consisting in a DLC Port ID—4 bytes—and a Data Link Correlator—4 bytes). The local use and contents of the Data Link Correlator and Port ID fields in SSP messages are defined locally. A Circuit ID value identifies a logical communication resource in a DLSw node.

For the Transport parameters, the transport ID fields should be learned from the first SSP messages exchanged with a DLSw partner (the capabilities exchange).

DLSw frames comprise two types of frames used to establish the connection which are the explorer frame whose mission is to determine the topology and the circuit-start frame whose goal is to start the connection to allow for meaningful transmission of SNA data traffic.

Figure 2:
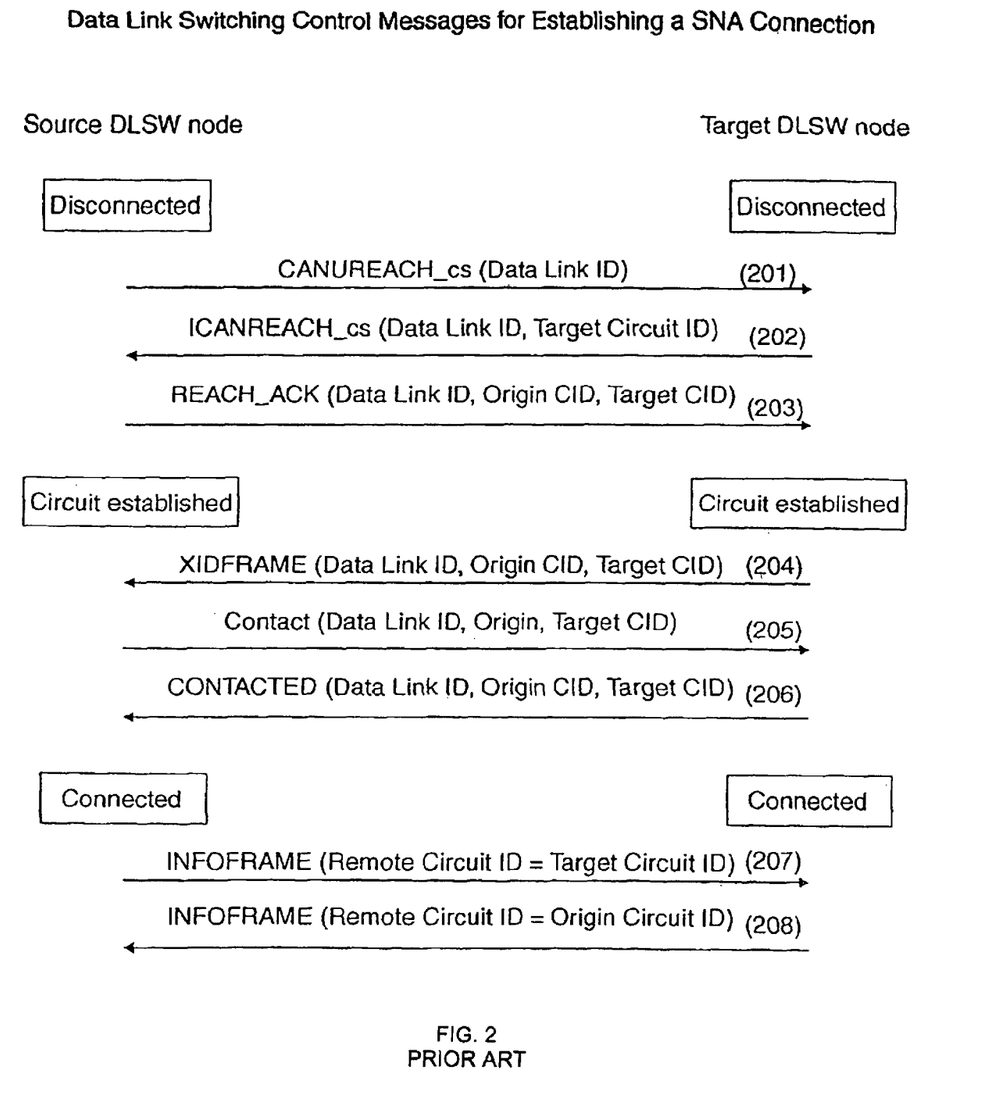
FIG. 2 is a dynamic view of the various Data Link Switching Control messages used to open a SNA connection as known from the prior art.

The broadcast of a DLSw explorer frame (the names of such explorer messages are terminated by the characters _ex) is triggered by the reception of a SNA test frame comprising a broadcast Exchange Identifier (XID). The source DLSw node either scans its cache or transmits an explorer frame to look for the specified destination SNA node. The cache option, described in the DLSw standard, is the possibility to maintain within a DLSw node, a table giving all the known SNA MAC/SAP address pairs, with the next DLSw nodes to access these MAC/SAP address pairs. This option reduces the quantity of broadcasted messages across the network. When the cache is not used or does not contain the required information, the source DLSw node sends a DLSw CANUREACH_ex frame to find a remote MAC and link SAP address. After reception by the source DLSw node of an ICANREACH_ex frame, a directed DLSw circuit start (CANUREACH_cs) frame (201) is sent to the target DLSw node. The sequence of frames needed to open a connection between the two DLSws nodes is illustrated in FIG. 2. The target DLSw starts a Data Link for each port (ICANREACH_cs 202) and thereby obtains a Data Link Correlator. The exchanges (203 to 206) according to DLSw protocols will be done with keeping the same group of data (Data link ID/MAC-SAP, Origin CID, Target CID). After these steps, SNA information traffic can flow (207 and 208) between the source and target DLSw nodes.

For the data link switching protocol a management function appears necessary at least because among the problems addressed by DLSw, are the potential time-outs caused to the SNA protocols crossing a Wide Area Network (WAN). SNA is a session oriented protocol and uses, for example, fixed protocol timers between adjacent SNA nodes in order to detect any loss of frame. DLSws provides acknowledgment of a frame at the local interface before the frame actually reaches the next hop, at the far end of the Wide Area Network. In this case, there is no way of informing the originator, that a frame has not actually reached its destination. The SNA architecture provides flow control at the link layer. The IP architecture, on the other hand, does not offer the same type of control. To solve that impairment of technologies, DLSw supports a flow control procedure between nodes based on forward and backward message procedures. DLSw specifies a method for reducing the required broadcast frames and searches throughout the network. By optionally caching information concerning the destination addresses, a DLSw node can respond to a local broadcast search without passing the locate messages to every segment of the network (local and remote segments and segment across the WAN).

Data Link Switching (DLSw) is a rather complex bridging protocol that requires a full implementation of TCP/IP protocol stacks in the nodes implementing the Data Link Switching protocols. Implementing a full set of TCP/IP protocol stacks is not only a complex task but also imply that each Data Link Switching node is in effect a full functionality router with all the complexities and severe overhead caused by router to router protocols that are not really required, just to transport SNA data. As a bridging protocol, the amount of overhead due to broadcast traffic (which in the Data Link Switching case is obtained by sending multiple copies of a "broadcast" message to every other DLSw node within the Wide Area Network) is very high and can very well be a severe problem within large Wide Area Networks (WANs).

It is thus an object of the present invention to provide simplified Data Link Switching-like capabilities to Wide Area Networks such as those using NBBS (Networking BroadBand Services) architecture.

More particularly, it is an object of the present invention to attach SNA devices (all types of SNA nodes) to the Wide Area Network such as NBBS network and therefore to enable meaningful communication across the Wide Area Network using traditional SNA protocols.

SUMMARY OF THE INVENTION

The present invention discloses a method and system for establishing a Systems Network Architecture (SNA) connection between a source SNA node and a target SNA node through a packet switching network using Data Link Switching (DLSw) access services, the packet switching network comprising a plurality of DLSw access nodes. The DLSw access nodes comprise one or a plurality of Data Link Switching (DLSw) access services including: directory services for locating resources across the packet switching network using a spanning tree; connection services for establishing connections between DLSw access nodes, and protocol services for understanding and/or interpreting Systems Network Architecture (SNA) protocol.

The present method comprises the steps of:
at a source DLSw access node, receiving from a source SNA node a first SNA request message for requesting the establishment of a SNA connection with a target SNA node;
at the source DLSw access node, locating a target DLSw access node providing access to the target SNA node sending an undirected query over the spanning tree;
at target DLSw access node providing access to the target SNA node, in response to the undirected query, sending to the source DLSw access node a reply message comprising addressing information of the target DLSw access node providing access to the target SNA node;
establishing a reserved or non reserved connection within the packet switching network between the source DLSw access node and the target DLSw access node;
at the target DLSw access node, sending to the target SNA node a second SNA request message for requesting the establishment of a SNA connection;
establishing a SNA connection between the source SNA node and the target SNA node.

The preferred embodiment for the invention takes advantage of many NBBS facilities such as the Control Point Spanning Tree, Directory Services and Connection Services to establish across the network DLSw paths (with a guaranteed or best effort quality of service) between DLSw access agents. The Access Agent makes use of NBBS facilities such as Non-Disruptive Path switching to insure reliability and availability. A guaranteed as well as a best effort service can be offered for the data traffic associated to these SNA connections.

More particularly the solution of the invention enables the communication between any two SNA devices (SNA nodes) attached to a NBBS network using standard SNA flows as if these two devices were locally adjacent (i.e attached to the same Local Area Network). From an SNA standpoint, all attached SNA nodes appear as if these were all interconnected via a LAN. One other advantage of the present invention is to reduce the cost of implementing DLSw services across a Wide Area Network by not requiring the implementation of a full TCP/IP protocol stack within DLSw nodes, by not requiring the implementation, maintenance and management of DLSw partner tables by the DLSw nodes. Also, with the present invention, the DLSw protocols are simplified by not requiring the sending of Explorer frames, using NBBS Directory Services capabilities instead. Finally, with the present invention, the broadcast traffic across the Wide Area Network is reduced because of the use of the NBBS Control Point Spanning Tree.

BRIEF DESCRIPTION OF THE DRAWINGS

The novel and inventive features believed characteristics of the invention are set forth in the appended claims. The invention itself, however, as well as a preferred mode of use, further objects and advantages thereof, will best be understood by reference to the following detailed description of an illustrative detailed embodiment when read in conjunction with the accompanying drawings, wherein:

DETAILED DESCRIPTION OF THE INVENTION

Figure 3:
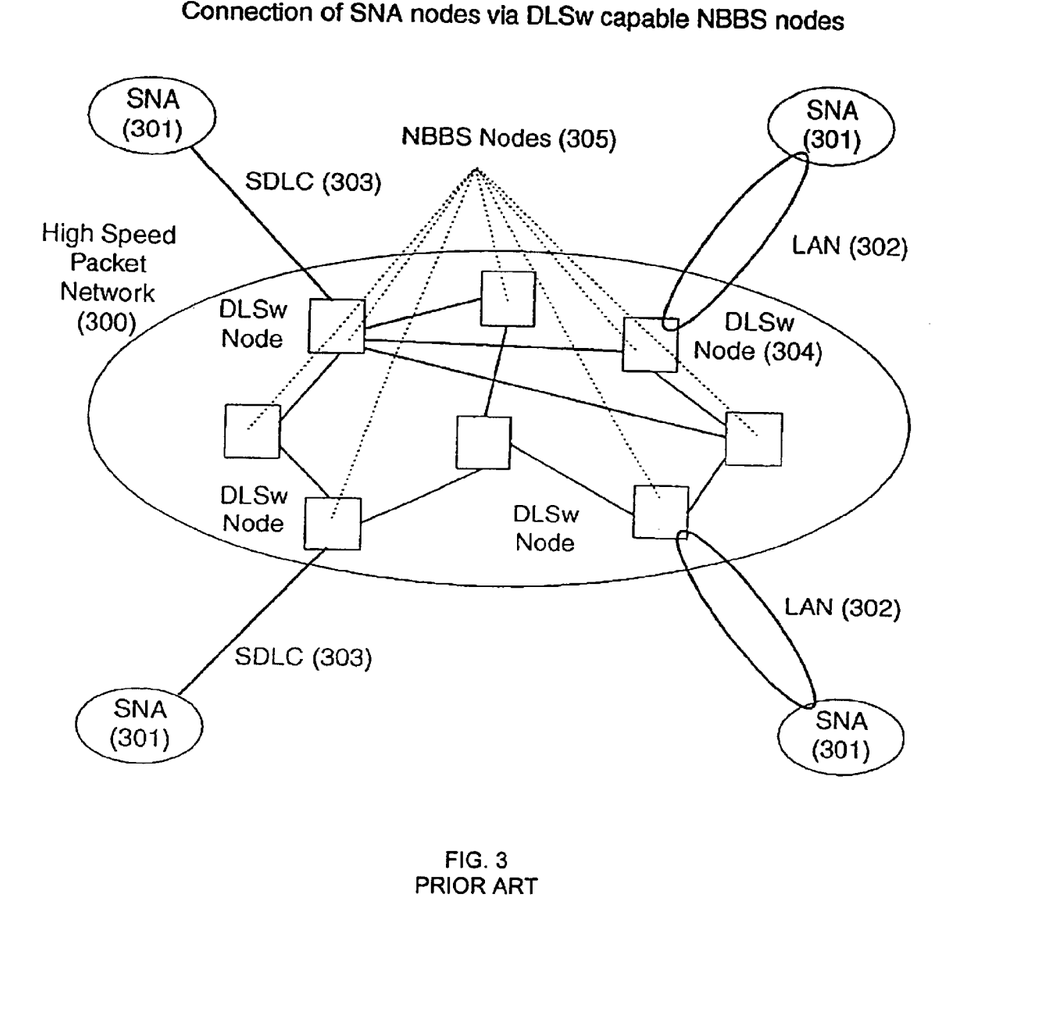
FIG. 3 shows a typical high speed packet switching network known from the prior art connecting SNA nodes via Data Link Switching capable NBBS nodes. SNA nodes are physically attached to the NBBS backbone through LAN or SDLC attachments.

As illustrated in FIG. 3, a typical network model is made up of several SNA nodes (301) communicating through a high performance network (300) using communication lines, provided by private carriers, or by public data networks service providers. Each SNA node can be described as an SDLC attached device (303) or a LAN attached device (302) within groups of SNA devices such as workstations or personal computers attached to a shared LAN (Local Area Network 302).

These SNA nodes, spread in different establishments, need to be interconnected through wide area transport facilities. Different approaches can be used for organizing the data transfer. Some implementations involve the checking for data integrity at each node within the High Speed Packet Network (300), thus slowing down the transmission. Others implementations are essentially looking for a high speed data transfer. To that end, the transmission, routing and switching techniques within the nodes are optimized to process the packets flowing toward their final destination at the highest possible rate. In the network of FIG. 3, the preferred embodiment will allow essentially looking for a high speed data transfer more particularly with the fast packet switching network architecture described in the following paragraphs while still preserving the Data Integrity objectives that are an integral and unavoidable part of the SNA information transport.

FIG. 3 is a general view of a fast packet switching transmission system comprising eight NBBS nodes (305), each of these nodes being interconnected by means of high speed communication lines called Trunks. Access to the high speed network by the users is realized through Access Nodes located at the periphery of the network. An Access Node is an NBBS Network Node providing Access Services such as the Data Link Switching Access Services as described in the present invention. These Access Nodes comprise one or more Ports, each of these ports providing an access point for attaching external devices by supporting standard interfaces to the network and by performing the conversions required for the transport of user data flows across the network from and to other external devices. The Access Node interfacing an SNA node via an SDLC line or a LAN is called a Data Link Switching node. (304).

Each NBBS network node includes a Routing Point where the incoming data packets are selectively routed on the outgoing Trunks towards the neighboring Transit Nodes (other intermediate NBBS nodes in the path to the destination). Such routing decisions are made according to the information contained in the header of the data packets. In addition to the basic packet routing function, the network nodes provide ancillary services such as the determination of routing paths for packets originated in the node, directory services for finding and updating location information about network users and resources, the maintenance of a consistent view of the physical network topology, including link utilization, and the reservation of the resources at the access nodes of the network.

All the information necessary for the routing function, about the nodes and transmission links connected to the nodes, are contained in a Network Topology Database. Under steady state condition, every Routing Point has the same view of the network. The network topology information is updated when new links are activated, new nodes added to the network, when links or nodes are dropped or when link loads change significantly. The fact that the network topology is kept current in every node through continuous updates allows for dynamic network reconfigurations without disrupting end users logical connections (sessions).

The Network Control Services are those that control, allocate, and manage the resources of the physical network. Each Routing Point has a set of the foregoing functions in the Route Controller and uses it to facilitate the communications (connection-oriented or connectionless) between users applications. The Network Control Services include more particularly Directory Services, Bandwidth Management, Path Selection, Control Spanning Tree, Topology Update and Congestion Control functions. Directory Services are for retrieving and maintaining information about network users and resources. The Directory Services use the Control Point Spanning Tree to multicast messages across the NBBS network. Bandwidth Management is for processing the bandwidth reservation and maintenance messages, and for monitoring the current reservation levels on links.

Path Selection may be used for choosing the best path between source and destination nodes within the network based on the user's traffic characteristics, quality of service requirements and link utilization levels. Control Spanning Tree is for establishing and maintaining a routing tree among the network nodes, for using it to distribute control information (in parallel) including link utilization, and for updating the Topology Database of the nodes with new network configurations or link/node failures. Topology Update is for distributing and maintaining, using the Spanning Tree, information about the logical and physical network (including link utilization information) in every node. Congestion Control is used for enforcing the bandwidth reservation agreements between the network users and the network which are established at the set up time, for estimating actual bandwidth and for adjusting reservation if necessary during the life of the communication.

Access Agents are located in the access nodes and, in the preferred embodiment, in the access link interfaces of the adapters connected to external communication devices. The external behavior of a particular Access Agent is primarily characterized by the Protocol Agent as it is responsible for participating in protocol exchanges with attached external devices and networks and mapping those protocols to the protocols used by the backbone network. The Protocol Agent uses the Directory Agent to locate the various resources with which it needs to communicate within the network. The Protocol Agent then uses the Connection Agent to establish and maintain reserved or best effort network connections with other Access Agents. Such network connections can then be used to transport data traffic such as SNA data in the present invention. The Directory Agent is responsible for the registration and localization of information relating to services provided by the Access Agent. The Directory Agent participates in the Directory Services which provides a distributed directory service throughout the network. The Directory Agent performs, in particular, three main functions which are the registration of users available through its Access Agent, the localization of users on behalf of the Protocol Agent and the response to queries to locate users that are received from other Directory Agents.

Locating a resource means determining the network address of the Access Agent representing the resource. Directory Agents rely on the use of a distributed database. Each Directory Agent maintains a local database of information about the external resources accessible through its Access Agent as well as information about remote resources it has cached. Each resource entry includes an identification of the resource, the characteristics associated with the resource, the network address information for the resource's Protocol, Connection and Directory Agents.

The Directory search process begins with an external user, using its native protocol, attempting to communicate with another user. The Protocol Agent portion of the local Access Agent receives this request and uses its Directory Agent to find the destination resources using the external-form address. The Directory Agent initially examines its database (also called Local Directory Database). If the resource is found locally, the network address information is verified via point-to-point network control messages (the NBBS message is called a Directed Explicit Query—DEQ) and then passed to the Protocol Agent. If the Resource is not found in the database, a NBBS query is broadcasted (the message is called a Undirected Explicit Query—UEQ), to all the Directory Agents in the directory set to which the destination belongs. Results of the query are cached in the Local Directory Database. The Directory Agent passes the result to the requesting Protocol Agent.

The Connection Agent is responsible for the establishment and ongoing maintenance of network connections that are provided by the Network Connection Layer. The Protocol Agent uses the Connection Agent to set up, maintain and take down the various network connections that are required to support the services provided by the Access Agent.

The RTP (Rapid Transport Protocol) is one connection-oriented, full duplex protocol, comprising the necessary functions to transport information in Broadband multi-services networks such as the one illustrated in FIG. 3. For instance, RTP provides the message segmentation and reassembly. It provides also a window-based congestion control mechanism that it is completely in line with the DLSw RFC (Request For Comments) specifications on flow control between DLSw nodes. RTP provides a mechanism to detect a loss of information to be exchanged with remote RTP partners (this mechanism allows the triggering of recovery mechanisms). Multiple RTP transport connections can be multiplexed onto a single network connection. RTP provides the In-order delivery of messages and a Reliable delivery option which is fundamental in the SNA environment.

RTP provides also a reliable transport mechanism to its users and therefore performs error detection and correction on its transport connections. The byte sequence numbers in the RTP header are used by RTP to detect and indicate errors or gaps in transmissions. RTP calculates the byte sequence number of the expected packet from the byte sequence number and user message length (fields in the RTP header). The byte sequence number in the RTP header identifies the first byte of the payload in this particular packet. If a packet arrives with higher than expected byte sequence number, RTP can deduce that one or more user messages (or segments) have been lost. RTP can then request that lost bytes be retransmitted using the status segment. For DLSw access service, retransmission is done in a "Go-back-N" mode. Optionally selective retransmission could be considered. RTP requests that all bytes from a certain point with byte sequence number N are retransmitted.

Figure 4:
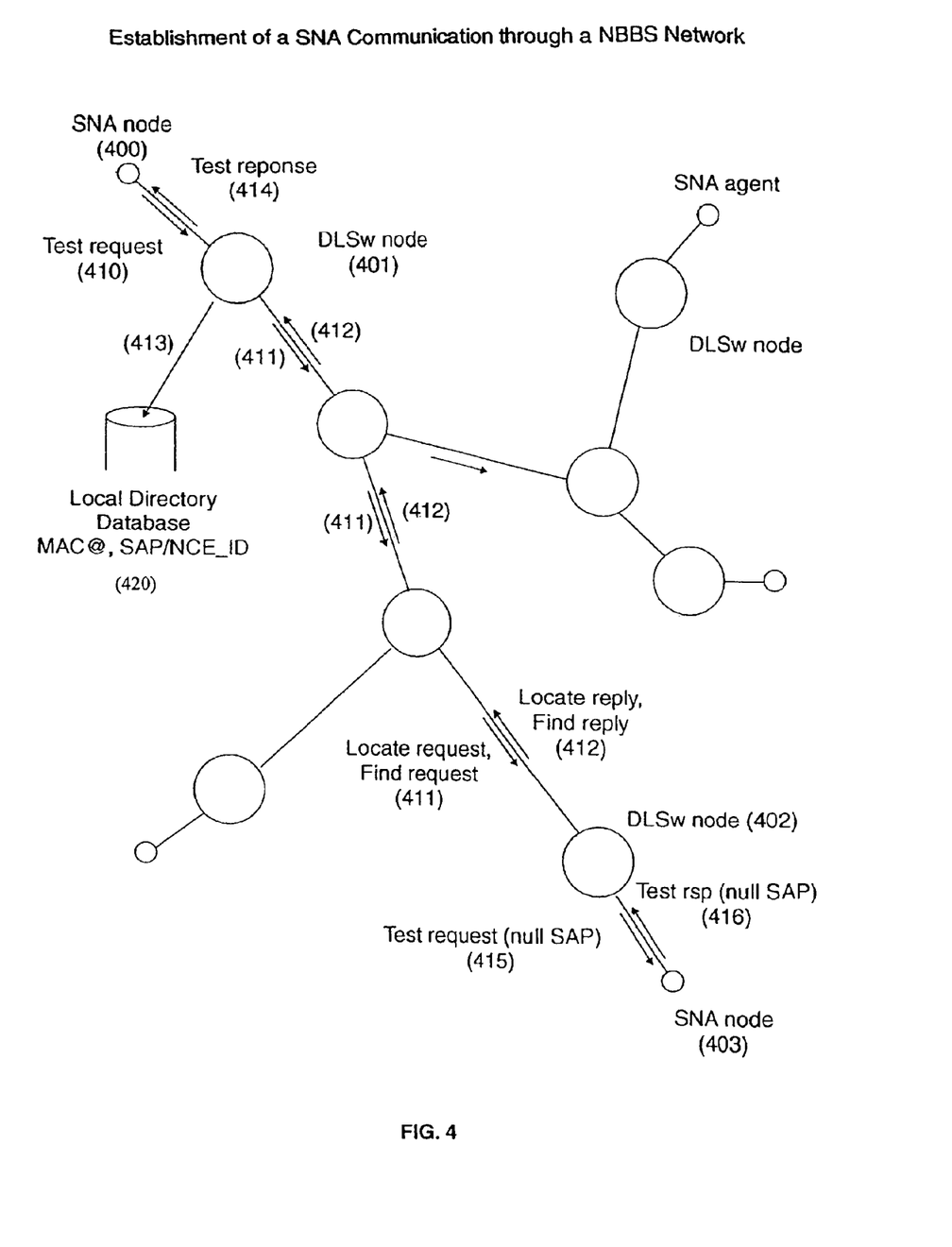
FIG. 4 shows, according to the preferred embodiment, a DLSw control message multicasted to every node within the NBBS network taking advantage of the NBBS Control Point Spanning Tree and NBBS Directory Services protocols.
Figure 5:
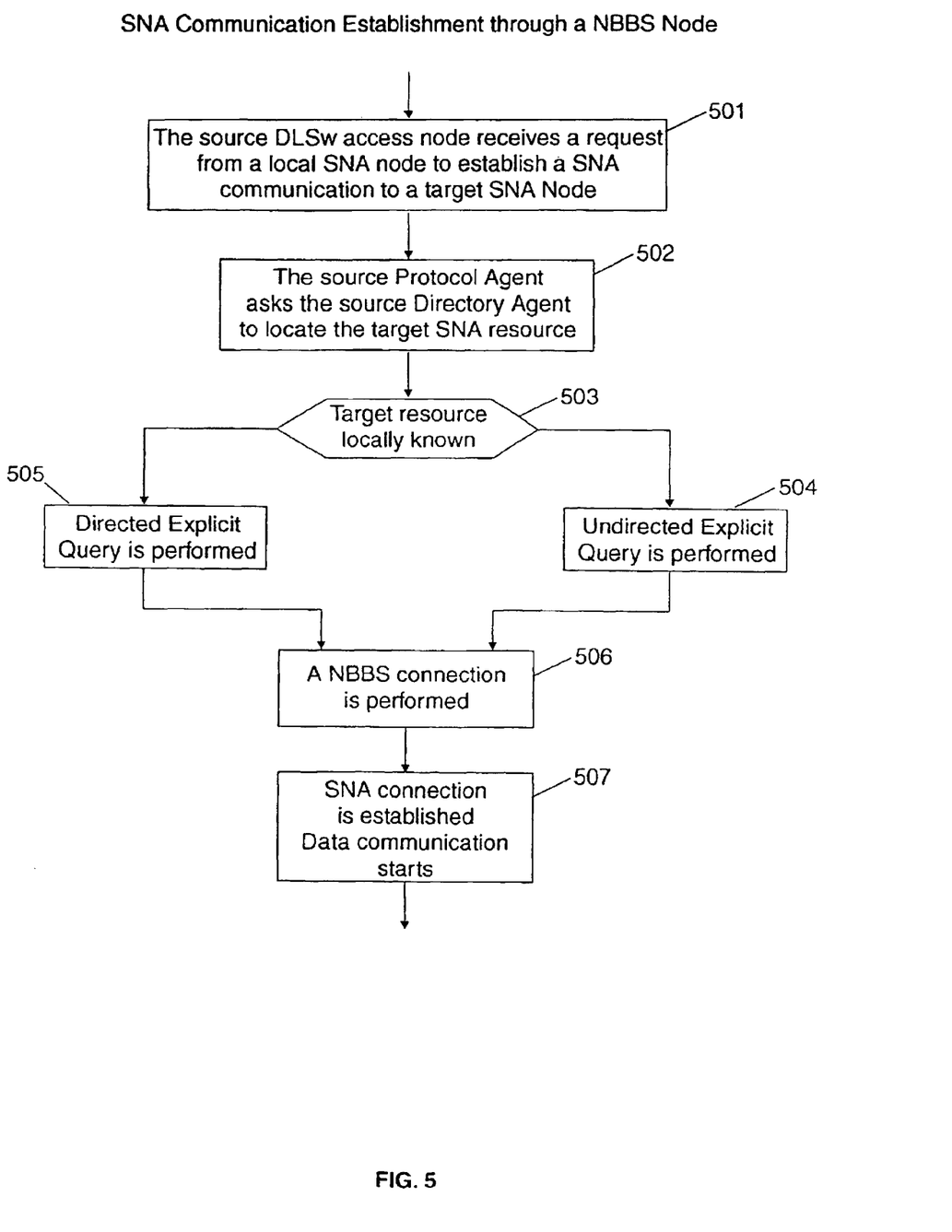
FIG. 5 is a flow-chart of the method according to the present invention to establish SNA communication across the NBBS network.

FIG. 4 describes the preferred embodiment of the invention and more particularly the exchange of messages during a connection between 2 DLSws nodes. FIG. 5 is a flow-chart of the method of establishing a SNA connection through a NBBS network according to the preferred embodiment of the invention. To start a SNA communication (501), the source SNA node (400) issues towards the source DLSw node, a SNA Test_Request message (410) via the LLC (Logical Link Control) layer with the MAC&SAP information for the target SNA node, destination of the communication. At this point, the source Protocol Agent uses the services of the source Directory Agent to locate the DLSw Access Agent providing access to the target SNA resource. First, the multicast capabilities of the NBBS network are used, a single locate message is broadcasted across the NBBS network. Second, there is no need for a DLSw Access Agent to maintain a table of all the possible DLSw nodes, along with their location and status. In a preferred embodiment, the source DLSw Protocol Agent within the source DLSw Access Agent (401) asks (502) the source Directory Agent to locate the target resource (the destination SNA node) across the NBBS network. At this point, two cases may occur (503) depending on whether or not the source Directory Agent has previously located the target SNA resource.

If (504), Case a) the source Directory Agent has never previously located the target SNA resource. In this case, the Local Directory Database of the source Directory Agent contains no information about the target SNA resource to be located. The source Directory Agent sends a NBBS UEQ message (Undirected Explicit Query) which consists in the sending of a broadcasted "LOCATE_REQUEST,FIND_REQUEST" NBBS control message (411) in order to determine the destination DLSw Access Agent (402) that provides access to the SNA resource, target of the search. This undirected directory search is performed over the NBBS Control Point Spanning Tree, with the destination address of the target SNA node (MAC&SAP information) as search parameter. The destination DLSw Access Agent providing access to the target SNA resource (402) answers to the UEQ via a "LOCATE_REPLY,FIND_REPLY" (412) NBBS control message. This control message comprises all the addressing information about the Access Agent providing access to the located target SNA resource to this search reply. This "LOCATE_REPLY,FIND_REPLY" NBBS control frame is received within the source DLSw node (401) by the source Directory Agent which stores (413) the returned information within its Local Directory Database (420) for a further search of the same resource. As described in case b) below, this cached information avoids the broadcasting of a locate request message if a SNA communication with the same destination is required later on. The cached information contains all the addressing information required to set up a reserved or best effort network connection to the destination Protocol Agent in the NBBS destination node, providing access to the target SNA resource.

If (505) Case b) the source Directory Agent has previously located the target resource, as a result of a previous search. In this case, the source Directory Agent sends a DEQ (Directed Explicit Query), which consists in a point to point "LOCATE_REQUEST,FIND_REQUEST" NBBS control message (411) in order to verify that the destination DLSw Protocol Agent (402) that provides access to the searched SNA resource, is still up and running and still provides access to the target resource. This directory search is performed with the destination address (MAC&SAP) of the target SNA node as search parameter. The destination DLSw Access Agent providing access to the target SNA resource (402) answers by a "LOCATE_REPLY,FIND_REPLY" NBBS control message (412). If a negative reply is returned from the destination Directory Agent, the information contained in the Local Directory Database is removed and the process is restarted from the beginning (an UEQ procedure is started). At this point, the source Protocol Agent uses the services of the source NBBS Connection Agent to setup a connection to the DLSw node providing access to the target SNA resource. A single NBBS connection is required, as opposed to the DLSw standard which requires two connections. A reserved or optionally a non-reserved connection can be requested.

In these two cases (504 and 505), the source DLSw node initiates (506) a connection to the target DLSw node across the NBBS network, after the sending of a Test_Response (414) SNA acknowledgment message to the source SNA node (400). The setting up of the NBBS network connection is performed by the Connection Agents of the two Data Link Switching (DLSw) Access Agents at both ends of the NBBS network. A reserved NBBS network connection, using RTP protocols is requested. Alternatively, as an option, a non-reserved connection (providing a best effort service) can be requested, using the destination's DLSw Protocol Agent NCE-id (Network Connection Endpoint identifier) returned by the Directory Agent on the previously described search across the NBBS network. The destination DLSw Access Agent (402), after the setup of the RTP connection issues a Test_Request SNA message with a null SAP (415) to the target SNA node (403). After receipt of a positive response from the target SNA node via a SNA Test_Response with null SAP message (416), the destination Protocol Agent informs the source Protocol Agent (401) of the successful establishment of the end-to-end path by means of a DLC_DL_STARTED SNA message. Consequently, there is no need for a TCP-IP protocol stack implemented within the DLSw Access Agent.

The SNA connection through the NBBS network is now established (507) and the SNA Data transport may start over the RTP reserved Network Connection (or optionally over the non-reserved Network Connection). The DLSw node returns to the source SNA node the Test_Response (414) message; indicating that the requested destination has been found and that data transmission may start.

In order to locate SNA nodes across a NBBS based Wide Area Network, the present invention uses the multicast capabilities of the NBBS protocol. The claimed method must be compared with the sending of multiple individual messages (explorer datagrams) to every possible DLSw node as described in the background art section. The invention minimizes the overhead generated by control messages in term of transmission on network links and processing within network nodes. The NBBS Directory and Spanning Tree services eliminates the need for maintaining a table of all the possible DLSws nodes along with their status within each and every DLSw node. This greatly reduces the complexities associated with the execution of Data Link Switching protocols within a data Link Switching node. NBBS protocols do not require the two unidirectional connections between communicating DLSw node, imposed by the DLSw standard. This reduces the amount of tables that need to be maintained within each DLSw node.

The amount of code which is necessary to develop for implementing the DLSw Access Agent is minimal as compared with the code for implementing a full TCP/IP Protocol Stack. Consequently, as there is no requirement for TCP/IP capabilities, the overhead in terms of network control messages that would be required by the IP protocols is dramatically reduced and consequently more connections can be supported.

What is claimed is:

1. A method for establishing a Systems Network Architecture (SNA) connection between a source SNA node and a target SNA node through a packet switching network using Data Link Switching (DLSw) access services, said packet switching network comprising a plurality of DLSw access nodes, said DLSw access nodes comprising one or a plurality of Data Link Switching (DLSw) access services including directory services that locate resources across the packet switching network using a spanning tree, connection services that establish connections between DLSw access nodes, and protocol services that are capable of at least one of understanding and interpreting Systems network Architecture (SNA) protocol, said method comprising the steps of:

at a source DLSw access node, receiving from a source SNA node a first SNA request message having an address identifying the target SNA node for requesting the establishment of a SNA connection with the target SNA node;

at said source DLSw access node, locating a target DLSw access node providing access to the target SNA node, sending an undirected query over the spanning tree;

at target DLSw access node providing access to the target SNA node, in response to the undirected query, sending to the source DLSw access node a reply message comprising addressing information of the target DLSw access node providing access to the target SNA node;

establishing a reserved or non reserved connection within the packet switching network between the source DLSw access node and the target DLSw access node;

at the target DLSw access node, sending to the target SNA node a second SNA request message for requesting the establishment of a SNA connection; and establishing a SNA connection between the source SNA node and the target SNA node.

2. The method according to claim 1 wherein the step of establishing a SNA connection between the source SNA node and the target SNA node, further comprises the steps of:

at the target DLSw access node, receiving from the target SNA node and forwarding to the source DLSw access node a response to the second SNA request message indicating that the SNA connection between the source SNA node and the target SNA node is established; and at the source DLSw access node, receiving from the target DLSw access node the response to the second SNA request message and sending to the source SNA node a response to the first SNA request message indicating that the SNA connection between the source SNA node and the target SNA node is established.

3. The method according to claim 2 comprising the further step of:

in the source DLSw access node, storing the addressing information of the target DLSw access node providing access to the target SNA node.

4. The method according to claim 3 wherein the step, at said source DLSw access node, of locating a target DLSw access node providing access to the target SNA node comprises the further steps of:

determining whether the addressing information of the target DLSw access node providing access to the target SNA node has been previously stored;

retrieving the addressing information of the target DLSw access node providing access to the target SNA node when said addressing information has been previously stored; and  sending by means of said retrieved addressing information a point to point directed query to the target DLSw access node providing access to the target SNA node.

5. The method according to claim 4 wherein said addressing information of the target DLSw access node providing access to the target SNA node comprises addressing information of the target DLSw access services within said target DLSw access node.

6. The method according to claim 5 wherein said undirected query comprises addressing information, in particular Medium Access Control/Service Access Point (MAC/SAP) address, of the target SNA node.

7. The method according to claim 6 wherein the packet switching network is a Networking Broadband Services (NBBS) network.

8. The method of claim 1, wherein the address identifying the target SNA node comprises at least Medium Access Control and Service Access Point information.

9. The method of claim 8, wherein sending the undirected query over the spanning tree comprises performing an undirected directory search over the spanning tree with the Medium Access Control and Service Access Point information as a search parameter.

10. A computer program product being operated on a processor in network access nodes of a high speed network, said access nodes providing Data link Switching (DLSw) access services in said high speed network, said computer program product comprising a usable medium for storing:

at a source DLSw access node, a program code module for:

receiving from a Source SNA node a first SNA request message for requesting the establishment of a SNA connection with a target SNA node;

upon reception of a first SNA request message, locating a target DLSw access node providing access to the target SNA node; and  using the access services for sending an undirected query over a spanning tree;

at target DLSw access node providing access to the target SNA node, a program code module for:

in response to the undirected query, sending to the source DLSw access node a reply message comprising addressing information of the target DLSw access node providing access to the target SNA node;

using the access service and the addressing information for establishing a reserved or non reserved connection within the packet switching network between the source DLSw access node and the target DLSw access node; and  using the access services for sending to the target SNA node a second SNA request message for requesting the establishment of a SNA connection and for establishing a SNA connection between the source SNA node and the target SNA node.

11. A method for establishing a Systems Network Architecture (SNA) connection between a source SNA node and a target SNA node through a packet switching network using Data Link Switching (DLSw) access services, comprising the steps of:

receiving at a source DLSw access node a first SNA request message having an address identifying the target SNA node, the SNA request message requesting an establishment of a SNA connection to a target SNA node;

sending an undirected query from said source DLSw access node over a spanning tree to locate a target DLSw access node, the target DLSw providing access to the target SNA node;

sending by the target DLSw access node to the source DLSw access node a reply message comprising addressing information of the target DLSw access node in response to the undirected query;

storing in the source DLSw access node addressing information contained in the reply message within in a local directory database for future use;

establishing a reserved or non-reserved connection within the packet switching network between the source DLSw access node and the target DLSw access node;

sending to the target SNA node by target DLSw access node a second SNA request message that requests the establishment of a SNA connection; and  establishing a SNA connection between the source SNA node and the target SNA node.

12. The method of claim 11, wherein the storing addressing information contained in the reply messages comprises removing information in the local database if a negative reply is received.

13. The method of claim 11, wherein the address identifying the target SNA node comprises at least Medium Access Control and Service Access Point information.

14. The method of claim 13, wherein sending the undirected query from said source DLSw access node over the spanning tree comprises performing an undirected directory search over the spanning tree with the Medium Access Control and Service Access Point information as a search parameter.

\* \* \* \* \*